(12) United States Patent
Aguirre

(10) Patent No.: US 12,451,282 B2
(45) Date of Patent: Oct. 21, 2025

(54) TANK FOR A LIQUID-FILLED SHELL TRANSFORMER OR SHELL REACTOR

(71) Applicant: Hitachi Energy Ltd, Zürich (CH)

(72) Inventor: Miguel Aguirre, Cordova (ES)

(73) Assignee: Hitachi Energy Ltd, Zürich (CH)

( * ) Notice: Subject to any disclaimer, the term of this patent is extended or adjusted under 35 U.S.C. 154(b) by 957 days.

(21) Appl. No.: 17/625,897

(22) PCT Filed: Nov. 20, 2019

(86) PCT No.: PCT/EP2019/082001
§ 371 (c)(1),
(2) Date: Jan. 10, 2022

(87) PCT Pub. No.: WO2021/004649
PCT Pub. Date: Jan. 14, 2021

(65) Prior Publication Data
US 2022/0277883 A1    Sep. 1, 2022

(30) Foreign Application Priority Data
Jul. 9, 2019   (EP) ..................... 19382581

(51) Int. Cl.
*H01F 27/12*    (2006.01)
*H01F 27/02*    (2006.01)
*H01F 27/06*    (2006.01)
(52) U.S. Cl.
CPC ........... *H01F 27/12* (2013.01); *H01F 27/025* (2013.01); *H01F 27/06* (2013.01)
(58) Field of Classification Search
CPC ......... H01F 27/12; H01F 27/025; H01F 27/06
See application file for complete search history.

(56) References Cited

U.S. PATENT DOCUMENTS

| | | | |
|---|---|---|---|
| 3,175,173 A * | 3/1965 | Welch | H01F 37/005 |
| | | | 336/84 R |
| 3,260,974 A * | 7/1966 | Specht | H01F 27/33 |
| | | | 174/15.1 |

(Continued)

FOREIGN PATENT DOCUMENTS

| | | | | |
|---|---|---|---|---|
| CN | 104335301 A | | 2/2015 | |
| DE | 2434003 A1 * | | 2/1976 | ............. H01F 27/33 |

(Continued)

OTHER PUBLICATIONS

Search Report, Chinese Patent Application No. 2019800982237, mailed Aug. 26, 2023, 8 pages.

(Continued)

*Primary Examiner* — Malcolm Barnes
(74) *Attorney, Agent, or Firm* — Sage Patent Group

(57) ABSTRACT

A tank for a liquid-filled shell transformer or shell reactor is provided. The tank includes: a lower tank portion, and an upper tank portion comprising an inner tank portion with inner sidewalls and an outer tank portion with outer sidewalls arranged radially outwardly with respect to the inner sidewalls. The lower tank portion and the inner tank portion are joined together along a substantially horizontal first perimetric joining line and defining an internal space. A space is formed between the inner sidewalls and the outer sidewalls, such space being in fluid communication with the internal space. The outer and the inner tank portions are joined together along a substantially horizontal second perimetric joining line. The tank further includes a tank cover configured to be joined to an upper end of the outer sidewalls. A method for assembling and an adjustable pad are also provided.

24 Claims, 8 Drawing Sheets

(56) References Cited

U.S. PATENT DOCUMENTS

| | | | | |
|---|---|---|---|---|
| 4,982,812 A | * | 1/1991 | Hwang | F24F 13/24 |
| | | | | 415/119 |
| 2011/0273255 A1 | * | 11/2011 | Thompson | H01F 27/02 |
| | | | | 220/652 |
| 2015/0091682 A1 | * | 4/2015 | Quintero Restrepo | ............ |
| | | | | H01F 27/02 |
| | | | | 336/94 |

FOREIGN PATENT DOCUMENTS

| | | | |
|---|---|---|---|
| EP | 3089179 A1 | | 11/2016 |
| JP | S50-067315 U | | 6/1975 |
| JP | S53-152128 U | | 11/1978 |
| JP | 55105307 A | * | 8/1980 |
| JP | S55-105307 A | | 8/1980 |
| JP | S55-105397 A | | 8/1980 |
| JP | S55-132925 U | | 9/1980 |
| JP | S61-015713 U | | 2/1985 |
| JP | S60-200506 A | | 10/1985 |
| JP | S61-030015 A | | 2/1986 |
| JP | S622505 A | | 1/1987 |
| JP | H05-029155 A | | 2/1993 |
| JP | H08-017643 A | | 1/1996 |
| JP | H08-111319 A | | 4/1996 |
| JP | 2007-067108 A | | 3/2007 |
| JP | 2010-192805 A | | 9/2010 |
| WO | WO-2013182227 A1 | * | 12/2013 ............. H01F 27/33 |

OTHER PUBLICATIONS

International Search Report and Written Opinion of the International Searching Authority, PCT/EP2019/082001, mailed Mar. 27, 2020, 21 pages.

Extended European Search Report, EP19382581.7, mailed Sep. 12, 2019, 12 pages.

Petersen, A. (Convenor), "Guide for Transformer Fire Safety Practices," Working Group A2.33, Jun. 2013, Cigre Publication, 139 pages.

Lindgren, S.R. (EPRI Project Manager), "Power Transformer Tank Rupture: Risk Assessment and Mitigation," TR-104994, Research Project 3212-01, Final Report Apr. 1995, Westinghouse Electric Corporation, 168 pages.

Kawamura, T., "Prevention of Tank Rupture due to Internal Fault of Oil-Filled Transformer," International Conference on Large High Voltage Electric Systems, 1988 Session, Aug. 28-Sep. 3, 1988, 12-02 Pref. Subj. 2, 9 pages.

Japanese Patent Application No. 2022-500907, Notice of Reasons for Refusal mailed Jan. 11, 2023, 10 pages.

* cited by examiner

TANK FOR A LIQUID-FILLED SHELL TRANSFORMER OR SHELL REACTOR

This application is a 35 U.S.C. § 371 national stage application of PCT International Application No. PCT/EP2019/082001 filed on Nov. 20, 2019, which in turn claims foreign priority to European Patent Application No. 19382581.7, filed on Jul. 9, 2019, the disclosures and content of which are incorporated by reference herein in their entirety.

The present disclosure relates to tanks for shell transformers or shell reactors that are filled with an insulating liquid, such as oil.

BACKGROUND

Power transformers or reactors may be subject to internal arc energy in case of internal failure. For example, an internal short circuit or other failure in the transformer winding may cause an internal arc generating an energy of e.g. 20 MJ. The insulating fluid surrounding the active part of the transformer or reactor may then vaporize and create an expanding gas bubble, causing an overpressure that damages the active part of the transformer and may also break the transformer or reactor tank. The rupture of the tank may cause oil spills and the risk of fire breaking out, and it is therefore important to prevent such a rupture from occurring.

Such an arc fault is more critical in shell-form transformers or shell-form reactors, which have a form-fit tank that mechanically fits around the active part of the transformer/reactor and is more rigid than a tank of core-form technology.

Indeed, the tank of a shell-form transformer needs to be strong and rigid in order to withstand short-circuit loads during normal operation: when an external or internal short circuit occurs in the electrical circuit of the transformer, there may be a dramatic increase of the electrical current in the windings, and this causes very high mechanical loads between the windings and on the tank. The tank needs to have enough strength and stiffness to withstand the mechanical loads without undergoing a plastic deformation, so it is able to resume normal operation after the short circuit.

The tank of shell transformers or reactors may be less flexible and less able to deform without breaking when subject to a high tensile stress. In case of an internal arc, the resulting overpressure will create mechanical stresses in the tank that may exceed the ultimate tensile strength of at least certain regions or parts of the tank, which may thus suffer a non-admissible strain and break, even in case of internal arcs with a relatively low level of energy.

Some solutions have been developed to address the problem of rupture of the tank in case of internal arc fault, especially for core-form transformers. Known solutions involve, for example, pressure relief devices, C-shaped clamps provided at discrete positions to reinforce the welded joint between different parts of the tank (for shell technology) and prevent them from breaking, or reinforcing ribs on the sidewalls of the tanks, as well as an increase in the mechanical properties of the tank itself so it can resist a certain degree of arc energy.

However, in some cases known solutions may not be suitable, or may not be sufficient, to prevent the rupture of the tank of a shell-type transformer or reactor in case of an internal arc fault, so it would be desirable to provide a tank that is safer and in which the risks of rupture is reduced.

DE2434003 discloses a noise attenuating double-wall tank for oil-filled transformers.

JP S55105397 describes a method wherein the upper and lower tank which constitute a transformer tank are welded at each flange surface and this flange section is clamped.

SUMMARY

According to a first aspect, a tank for a liquid-filled shell transformer or shell reactor is provided. The tank comprises: a lower tank portion comprising a bottom plate and lower sidewalls, and an upper tank portion. The upper tank portion comprising an inner tank portion with inner sidewalls and an outer tank portion with outer sidewalls, wherein the outer sidewalls are arranged radially outwardly with respect to the inner sidewalls such that the outer tank portion surrounds the inner tank portion. The tank further comprises the lower tank portion and the inner tank portion joined together along a substantially horizontal first perimetric joining line and defining an internal space for housing an active part of the shell transformer or shell reactor and an insulating liquid, wherein a space is formed between the inner sidewalls and the outer sidewalls, wherein the space is in fluid communication with the internal space for housing the active part of the shell transformer or shell reactor and insulating liquid, and the outer tank portion and the inner tank portion being joined together along a substantially horizontal second perimetric joining line, wherein the tank further comprises a tank cover configured to be joined to an upper end of the outer sidewalls of the outer tank portion.

The outer tank portion does not need to remain operative after an arc failure incident, and may therefore be designed with enough flexibility to absorb the internal arc energy by deforming outwards, without reaching rupture. In this respect, in case of an overpressure caused by an internal arc in the transformer or reactor, the deformation of the outer tank portion provides a protection of the inner tank portion, and the increase in the inner volume caused by the deformation also reduces the overpressure inside the tank.

In summary, a tank arrangement including an upper tank portion comprising an outer tank portion surrounding an inner tank portion provides a safer tank, with a lower risk of oil spills and fire hazard in case of an arc failure, while at the same time maintaining the advantages of a strong and rigid structure suitable for resisting short circuits during normal operation.

In some examples, the outer tank portion is arranged at a distance from the inner tank portion, for example a distance of at least 15 millimetres. Such a distance between the outer sidewalls and the inner sidewalls of the tank allows the pressure wave generated in the insulating liquid by the internal arc to reach also towards the lower part of the outer sidewall, so that substantially all the extension of the outer sidewall may deform and absorb arc energy.

In some examples, the tank further comprises a reinforcing cincture surrounding and joined to the lower sidewalls of the lower tank portion and the outer sidewalls of the outer tank portion and forming a sealed chamber enclosing the first perimetric joining line between the lower tank portion and the inner tank portion and the second perimetric joining line between outer tank portion and the inner tank portion.

The reinforcing cincture provides a protection of the joints between the lower tank portion and the inner tank portion and between the outer tank portion and the inner tank portion and displaces the weakest point of the tank to other regions e.g. the outer tank portion, where the overpressure can be more easily accommodated.

Furthermore, the reinforcing cincture being configured to form a sealed chamber surrounding the joint between the lower and inner tank portions and the joint between the inner and outer tank portions means that even if the primary weld mail fail or break at one or more points due to a very high overpressure and stress, the insulating liquid, for example oil, will be confined in the chamber and will not spill out of the tank thanks to the additional protection. The reinforcing cincture therefore has the additional advantage of protecting the environment from an oil spill and from the risk of fire associated with such an oil spill.

The present disclosure also provides a liquid-filled shell transformer or shell reactor with a tank as disclosed herein.

Embodiments of tanks presented in the present disclosure are suitable for single-phase shell transformers and reactors, but may also be applied in multiphase shell systems, such as three-phase transformers and reactors.

According to a second aspect, the present disclosure provides a method for assembling a liquid-filled shell transformer or shell reactor. Such methods may include providing an outer tank portion and an inner tank portion, configured to be joined to each other along a substantially horizontal perimetric joining line, wherein the inner tank portion comprises a short circuit beam mounted at an inner surface of inner sidewalls of the upper tank portion, and mounting the outer tank portion on the inner tank portion and welding them together along the perimetric joining line thereby forming an upper tank portion. Methods may include providing a lower tank portion configured to be joined to the inner tank portion along a substantially horizontal further perimetric joining line, mounting an active part of the shell transformer or shell reactor inside the lower tank portion, mounting the inner tank portion on the lower tank portion welding them together along the further perimetric line, providing a tank cover, mounting the tank cover on a top of the outer tank portion and welding them together.

BRIEF DESCRIPTION OF THE DRAWINGS

Particular embodiments of the present device will be described in the following by way of non-limiting examples, with reference to the appended drawings, in which.

DETAILED DESCRIPTION

In the present disclosure the expressions upper, lower, vertical, horizontal, etc. are given with reference to the intended position of the transformer and the tank when in use.

In the present disclosure, the expression "transformers" is also meant to encompass autotransformers.

Figure 1:
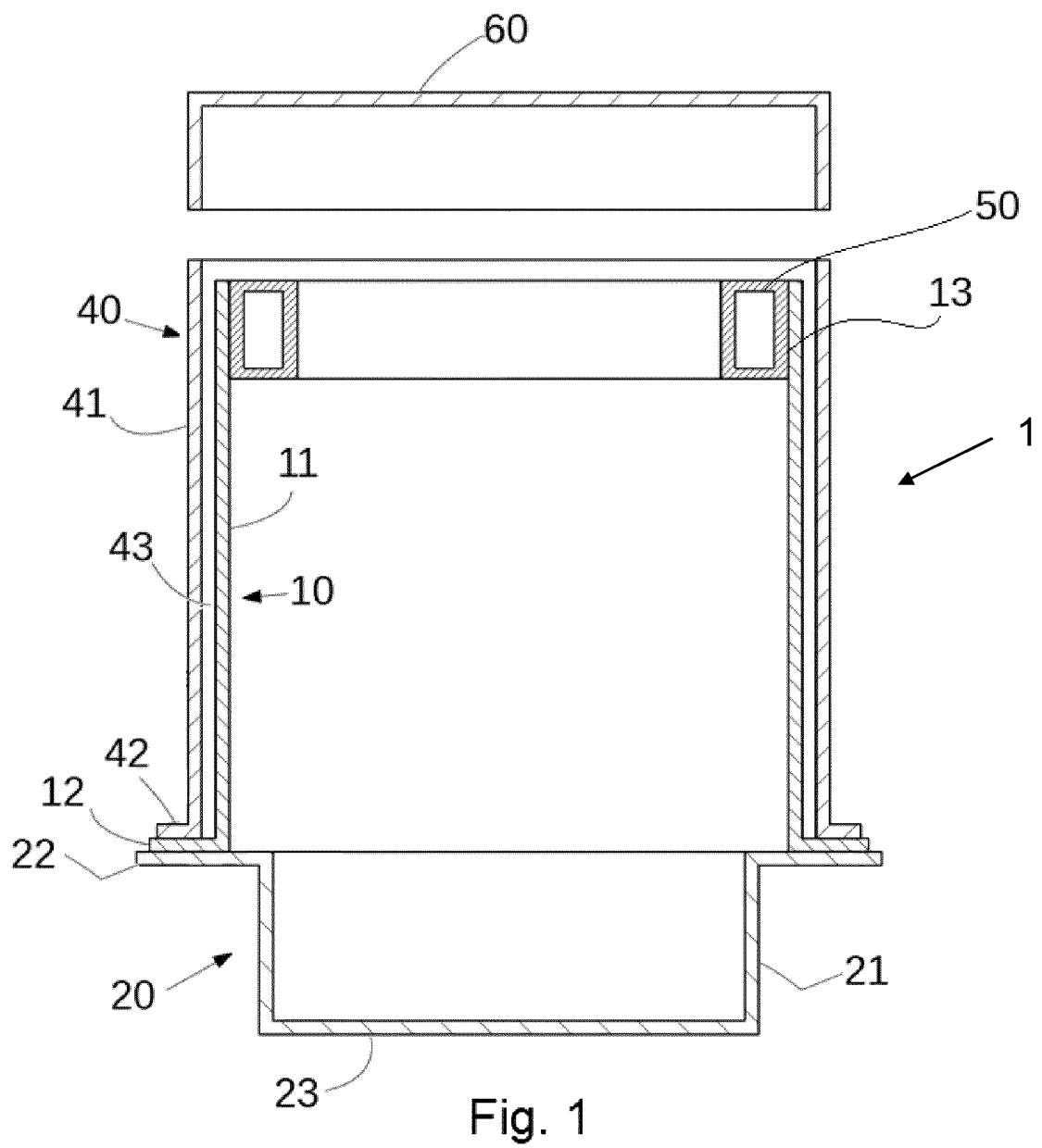
FIG. 1 is a schematic cross section view of a lower tank portion, an inner tank portion and an outer tank portion of a tank according to an example of the present disclosure.

FIG. 1 is a schematic cross section view of a lower tank portion and an upper tank portion 1, wherein the upper tank portion may comprise an inner tank portion and an outer tank portion, according to an example of the present disclosure.

The terminology employed in the present application differs slightly from that of the priority application, without changing the subject matter of the disclosure, merely to increase the accuracy of the terms used for each part of the tank. Namely, in the present disclosure, the term "inner tank portion 10" has been introduced, to refer to the "upper tank portion 10" of the priority application, while the term "upper tank portion 1" is herein employed to refer to the assembly of the "inner tank portion 10" and the "outer tank portion 40". Accordingly, the "upper sidewalls 11" of the priority application are herein the "inner sidewalls 11".

Particularly, an inner tank portion 10 is provided. Said inner tank portion 10 may be e.g. a prismatic tank. The inner tank portion 10 may comprise inner sidewalls 11 that are substantially vertical and end in a horizontal flange 12 at a lower end of the inner sidewalls 11, extending all around the perimeter of the inner tank portion 10. The flange may be formed by bending the end portion of the inner sidewalls 11 (and thus the flange may be integrally formed with the inner sidewalls 11). In some other examples, the flange 12 may be welded to at or near the lower end of the inner sidewalls 11 e.g. by a weld seam.

In the present disclosure and in the attached claims, the terms "inner tank portion" and "inner sidewalls" are employed to indicate structural elements surrounding and in contact with the active part of the transformer or reactor. These terms encompass conventional tank structures with continuous walls, but also structures wherein the inner sidewalls surrounding the active part of the transformer are not continuous, such as structures comprising bars, cages, walls with openings and the like.

Additionally, a lower tank portion 20 is provided. The lower tank portion 20 may also be, e.g., a prismatic tank. The lower tank portion 20 is configured to match the shape of the inner tank portion 10 such that both portion 10, 20 can be joined to form a tank for containing an active part, for example of a shell transformer or a shell reactor (not shown).

The lower tank portion 20 comprises a bottom plate 23, lower sidewalls 21, which are substantially vertical and end in a horizontal flange 22 located at or near an upper end of the lower sidewalls 21. The flange 22 extends all around the perimeter of the lower tank portion 20. The lower tank portion 20 may have smaller internal horizontal and vertical dimensions with respect to the inner tank portion 10, but the dimensions of the flange 12 of the inner tank portion 10 and the flange 22 of the lower tank portion 20 may be configured to match and form between them a horizontal perimetric joining line between the inner tank portion 10 and the lower tank portion 20.

In this respect, the inner tank portion 10 and the lower tank portion 20 are assembled to form part of the tank. The horizontal flange 12 may be overlapped on horizontal flange 22 and the two flanges may be welded together e.g. with a weld seam that joins and seals the two portions 10, 20 of the tank all around the substantially horizontal perimetric joining line.

In tanks for shell technology, a winding package (not shown, typically formed by multiple pancakes stacked and connected in series) is provided arranged inside the lower tank portion 20. The transformer core (not shown) is then stacked around the winding package, on the bottom plate of the tank. The inner tank portion 10 is then set on the lower tank portion 20, surrounding the core, and is welded to the lower tank portion. The space in the tank is filled with an insulating liquid, such as oil. It is noted that the transformer of this example may correspond to a three-phase transformer although other transformer arrangements are possible e.g. a single-phase transformer.

In summary, the lower tank portion and the inner tank portion define between them an internal space for the shell-form active part (windings, core, etc.) and the insulating liquid. As commented above, the tank, and therefore the inner and lower tank portions, may be prismatic. Typically, it may be a rectangular prism.

In some examples, the tank may also be provided with a short-circuit beam, which will be described later on.

An outer tank portion 40 is further provided. The outer tank portion 40 comprises outer sidewalls 41 that are substantially vertical and end in a horizontal flange 42 located at a lower end of the outer sidewalls 41. Similarly as before, the flange 42 may be formed by bending a lower portion of the outer sidewalls 41. In some other examples, the flange 42 may be welded to the lower end of the outer sidewalls 41.

The dimensions of the flange 12 of the inner tank portion 10 and of the flange 42 of the outer tank portion 40 may be configured to match and form between them a horizontal perimetric joining line between the inner tank portion 10 and the outer tank portion 40.

In this respect, the inner tank portion 10 and the outer tank portion 40 are assembled to complete the upper portion 1 of the tank. The horizontal flange 42 may be overlapped on horizontal flange 12 and the two flanges may be welded together, e.g., with a weld seam that joins and seals the two portions 40, 20 of the tank all around a substantially horizontal perimetric joining line.

In this respect, the outer sidewalls 41 of the outer tank portion 40 may surround all the inner tank portion 10. Particularly, the outer sidewalls 41 may be arranged radially outwardly with respect to the inner sidewalls 11 of the inner tank portion at a distance of at least 15 millimetres from the inner sidewalls 11, preferably at a distance between 20-60 millimetres, more preferably at a distance between 20-30 millimetres.

In some cases, the outer sidewalls 41 of the outer tank portion may have a higher ultimate tensile strength with respect to the ultimate tensile strength of the inner sidewalls 11 of the upper tank portion 1 and/or the lower sidewalls 21 of the lower tank portion. However, the material may also be the same for all the tank, and the increased flexibility of the outer tank portion with respect to the inner tank portion may depend on the geometry, e.g., the outer tank portion may be thinner, and/or have less stiffening or reinforcing elements than the inner tank portion.

The outer tank portion 40 may be designed such that it can deform to accommodate the overpressure caused by an internal arc, without breaking.

The outer sidewalls 41 of the outer tank portion 40 may further be provided with ribs, e.g., vertical and/or horizontal ribs. The ribs may be located, e.g., on an outer surface of the outer sidewalls. For example, in case of a prismatic tank with two larger sides and two smaller sides, ribs may be provided at least on the two larger sides. The number, position and/or configuration of the ribs to provide a suitable compromise between strength and flexibility will depend on each particular case.

A tank cover 60 is further provided. Upon assembly, the tank cover 60 may be welded to the top of the outer tank portion 40, i.e., to the upper end of the outer sidewalls 41. The cover 60 may have sidewalls as shown in the figures, but it may also be flat or have other configurations, and may comprise other usual elements such as conduits, reinforcing ribs and the like.

As visible in FIG. 1, a space 43 is formed between inner sidewalls 11 of the inner tank portion 10 and outer sidewalls 41 of the outer tank portion 40. This space 43 is in fluid communication with the above-commented internal space for housing the active part of the shell transformer or shell reactor and insulating liquid. The space 43 is therefore also filled with the insulating liquid, and pressure waves may travel inside this space.

In case of an internal arc, the arc energy will cause a high increase in the pressure of the insulating liquid and an outward deformation of the outer tank without breaking and thus the overall pressure in the tank may be reduced. As a result, the risk of rupture of the attachment points between the inner tank portion and the lower tank portion, and between the outer tank portion and the inner tank portion is also reduced.

The inner tank portion may in practice be so rigid that it undergoes little or no deformation: in any case, the behaviour of the inner tank portion in case of internal arc is not so relevant, since it is the outer tank that is designed to absorb most of the arc energy and preventing a rupture of the tank that may cause an oil spill.

At least part of the tank cover 60, e.g., at least the sidewalls thereof, may have the same degree of flexibility as the outer tank portion 40, i.e. it can also deform in a similar way without breaking. This maintains a reduced degree of stress on the joint between the cover 60 and the outer tank portion 40.

It is noted that transformers may also occasionally suffer from external short-circuits. When such a fault occurs heat and stress may be generated, e.g., on the winding packages that may be enormous. For these reasons, as also visible in FIG. 1 in some examples the inner tank portion 10 may be equipped with a short-circuit beam 50 that strengthens the inner tank portion to withstands such stress.

Figure 2:
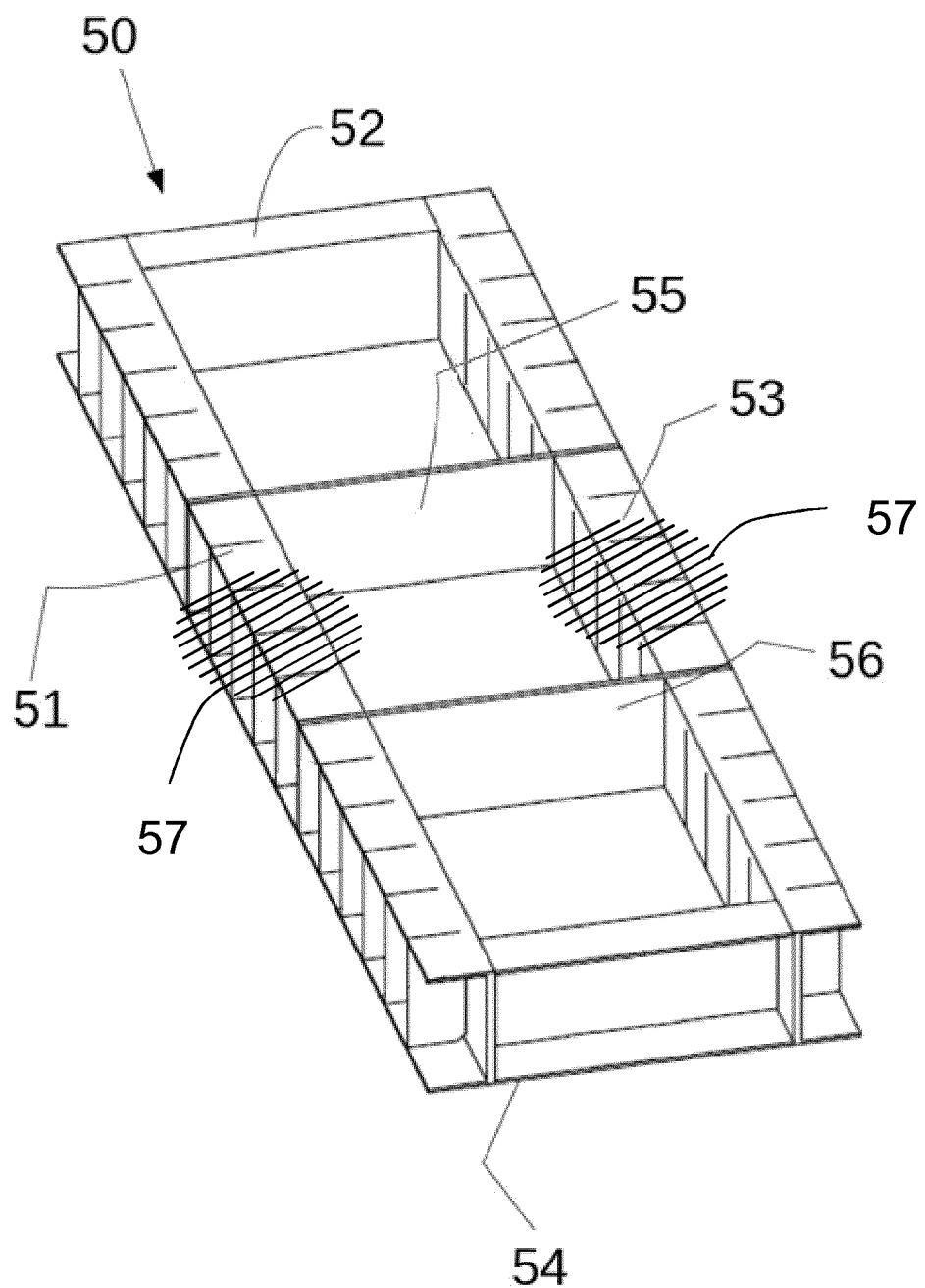
FIG. 2 is a schematic perspective view showing a short-circuit beam forming part of the tank which may be the same or similar to the one shown in FIG. 1.

As shown in FIG. 2, the short-circuit beam 50 comprises two U-shaped profiles 51, 53 and two U-shaped beams 52, 54, welded together forming a resistant structure, substantially continuous and substantially matching the prismatic shape of the inner tank portion 10. The profiles and beams may also have a cross section with any other shape and dimension. In other examples, the short-circuit beam 50 may be integrally formed.

Each U-shaped profile 51, 53 comprises an upper branch and a lower branch for attachment to an inner surface of two of the inner sidewalls of the inner tank portion 10. Similarly, each beam 52, 54 comprises an upper branch and a lower branch for attachment to the inner surface of other two of the inner sidewalls of the inner tank portion 10.

The short-circuit beam 5 further comprises two interphase elements 55, 56. The function of the interphase elements is to separate each phase forming part of the transformer. It is noted that, in case of a single-phase transformer, the interphase elements 55, 56 may be omitted from the short-circuit beam 50.

Again in FIG. 1, in use, the short-circuit beam 50 may be mounted inside an upper inner portion 13 of the inner sidewalls 11 of the inner tank portion 10, completely surrounded by the inner sidewalls 11, and may be joined to the inner portion 13 of the inner sidewalls of the inner tank portion e.g. by welding to form an integral structure.

The presence of the short-circuit beam 50 strengthens the inner tank portion 10 and allows it to resist the stress generated, e.g., by external or internal short-circuits without undergoing a permanent deformation, while at the same time the high strength of the inner tank portion 10 does not compromise the safety of the tank in case of an internal arc failure, because the outer tank 40 allows accommodating the resulting overpressure without breaking.

Figure 3:
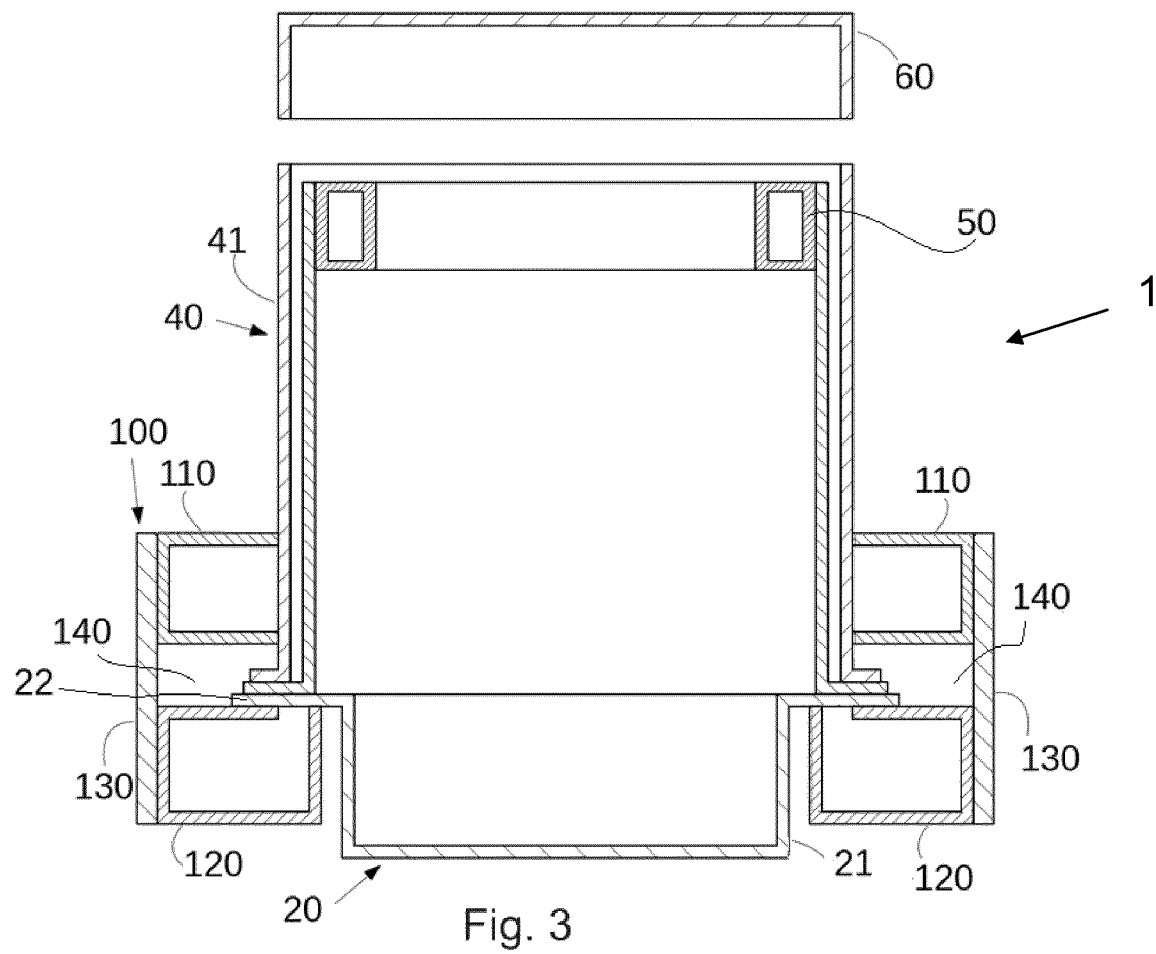
FIG. 3 is a schematic cross section view of a lower tank portion, an inner tank portion and an outer tank portion of a tank which may be the same or similar to the one shown in FIG. 1 further comprising a reinforcing cincture applied to the joint between the inner tank portion and the lower tank portion and the joint between the inner tank portion and the outer tank portion.

FIG. 3 is a schematic cross section view of a lower tank portion 20, an inner tank portion 10 and an outer tank portion 40 of a tank which may be the same or similar to the one described in FIG. 1, further comprising a reinforcing cincture 100 applied around the joint between the inner tank portion 10 and the lower tank portion 20 as well as the joint between the inner tank portion 10 and the outer tank portion 40. That is, the inner tank portion may be used to join both parts of the upper tank portion, i.e. the inner and outer tank portions, but also the upper and lower tank portions together. The tank shown in FIG. 3 may differ from the tank shown in FIG. 1 only in that a reinforcing cincture 100 is provided.

Joined to the outer sidewalls 41 of the outer tank portion 40 is shown an upper reinforcing ring 110, which may be hollow and may for example have a U-shaped cross section as shown, but also a cross section that is rectangular or has any other shape or dimension.

The upper reinforcing ring 110 may be provided to surround all the outer tank portion 40 forming a continuous piece, and may be joined to the outer sidewalls 41 of the outer tank portion 40 by welding.

Joined to the flange 22 of the lower tank portion 20 is shown a lower reinforcing ring 120, which may be hollow and may for example have a G-shaped cross-section as shown, but also a cross section that is rectangular or has any other shape or dimension. The lower reinforcing ring 120 may project further horizontally from the vertical sidewall 21 than the horizontal flange 22, and may also or alternatively be attached to the lower sidewall 21.

Lower reinforcing ring 120 may surround all the lower tank portion 20 forming a continuous piece, and it may be joined to the lower tank portion 20, e.g., by welding.

A closing plate or belt 130 may be applied against the upper reinforcing ring 110 and lower reinforcing ring 120 and joined to both. For example, it may be welded to the rings 110 and 120. In some other examples, the joint between the belt 130 and the reinforcing rings 110, 120 may be formed by bolting instead of welding. Belt 130 may be applied surrounding all the tank in a continuous and sealing way.

The assembly of upper reinforcing ring 110, lower reinforcing ring 120 and belt 130 forms the reinforcing cincture 100 that surrounds the outer sidewalls 41 and lower sidewalls 21 of the outer tank portion 40 and the lower tank portion 20 respectively, at the level of the perimetric joining line between the outer tank portion and the inner tank portion and of the perimetric joining line between the inner tank portion and the lower tank portion. As a result, the reinforcing cincture 100 may form a sealed chamber 140 enclosing all the perimetric joining line between the inner and outer tank portions and all the perimetric joining line between the inner and the lower tank portions.

The chamber may be a single, substantially toroidal-like chamber all around the perimeter of the tank, or may be divided in multiple separate compartments for example by vertical plates (not shown).

The reinforcing cincture 100 strengthens and protects the joining between the outer tank portion 40 and the inner tank portion 10 and the joining between the inner tank 10 portion and the lower tank portion 20.

The joint between the outer tank portion and the inner tank portion of the tank may be a weak point and may not be able to withstand the overpressure resulting from an internal arc, and would tend to break. The same may be true for the joint between the inner tank portion and the lower tank portion.

In some embodiments, as commented above, due to the provision of the outer tank portion which is able to deform without breaking, the tank structure is more flexible, and it is able to withstand the overpressure generated by an internal arc fault. In some embodiments, the reinforcing cincture provides a specific protection to the joint between the inner tank portion and the lower tank portion of the tank and to the joint between the inner tank portion and the lower tank portion of the tank. Particularly, the reinforcing cincture may displace the weakest point from the joints to other regions of the tank (e.g., the outer tank portion) where the overpressure and the consequent stresses on the tank walls can be more easily accommodated.

Furthermore, the sealed chamber 140 surrounding the joints between the lower and inner tank portions and between the inner and outer tank portions provides further safety to the tank, because even if the joints (e.g., welds) mail fail or break at one or more points due to a very high overpressure and stress, the insulating liquid, for example oil, will be confined in the chamber and will not spill out of the tank.

Figure 4:
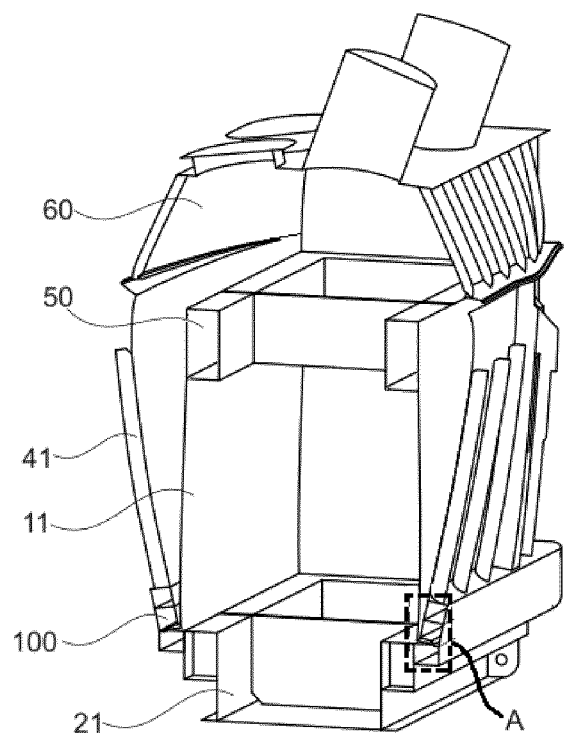
FIG. 4 is a diagram showing the deformation of a tank according to an example of the present disclosure, in case of an internal arc.

FIG. 4 shows a simulation of the deformation occurring in a tank according to an example of the present disclosure, for example a tank such as that of FIG. 3, in case of an internal arc, and illustrates in particular the advantages of the tank structure with an outer tank portion 40 having outer sidewalls 41 surrounding the inner sidewalls 11 of the inner tank portion 10. The effects of the short circuit beam 50 and of the reinforcing cincture 100 are also illustrated.

As visible in FIG. 4, in case of a sudden rise in the internal pressure due to an internal arc, the inner sidewalls 11 of the inner tank portion 10 reinforced by the short circuit beam 50 and therefore very rigid, substantially maintain their shape or suffer only a small deformation.

On the contrary, the outer sidewalls 41 of the outer tank portion 40 and of the attached cover 60 may bulge outwards, deforming without breaking, such that there is no oil spill from the transformer. This deformation also provides an increase of the internal volume of the tank and therefore a reduction of the internal pressure and of the stress on other parts of the tank.

The transformer is therefore protected at the same time from both types of critical loads, short circuit and arc failure, by two structures with a different mechanical design, each addressing a particular condition or transformer failure.

Figure 5:
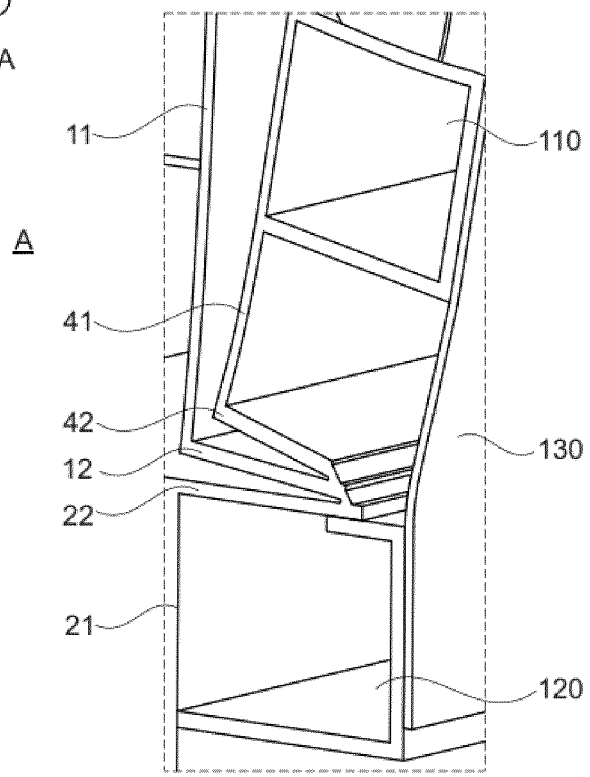
FIG. 5 shows an enlarged detail of FIG. 4.

FIG. 5 shows an enlarged detail of FIG. 4 showing the deformation in the area of the joint between the inner sidewall 11 of the inner tank 10, the lower sidewall 21 of the lower tank 20, and the outer sidewall 41 of the outer tank 40, through the respective flanges 12, 22 and 42 and welds, and the reinforcing cincture 100 with the upper and lower reinforcing rings 110 and 120 and the closing plate 130.

In particular, FIG. 5 illustrates the small deformation of inner sidewall 11 and the much larger deformation of outer sidewall 41, and also shows how the area of the welded joint is protected by the reinforcing cincture 100.

Under operating loads, and due to the length of the U-shaped beams 51, 53; the central area 57 see (FIG. 2) may be more likely to deform than the ends. By "central area" 57 it is meant not only the longitudinal middle point of the U-shaped beam but an area of between 30%-50% of the total length of the U-shaped beam around this point, as shown in stripped lines in FIG. 2.

In order to reinforce the central area 57 of the U-shaped beam, in some examples, the tank may comprise an adjustable pad 300 attached to the outer sidewall 41 of outer tank portion 40. The adjustable pad 300 may be arranged in correspondence with the central area 57 of the U-shaped beam 51, 53.

In some examples, the tank may be designed to comprise more than one transformer phase, for instance three transformer phases. In such cases, the U-shaped beam may comprise an adjustable pad in correspondence with each transformer phase or winding. In addition, in such examples each U-shaped beam may comprise an adjustable pad in correspondence with each phase.

Figure 7:
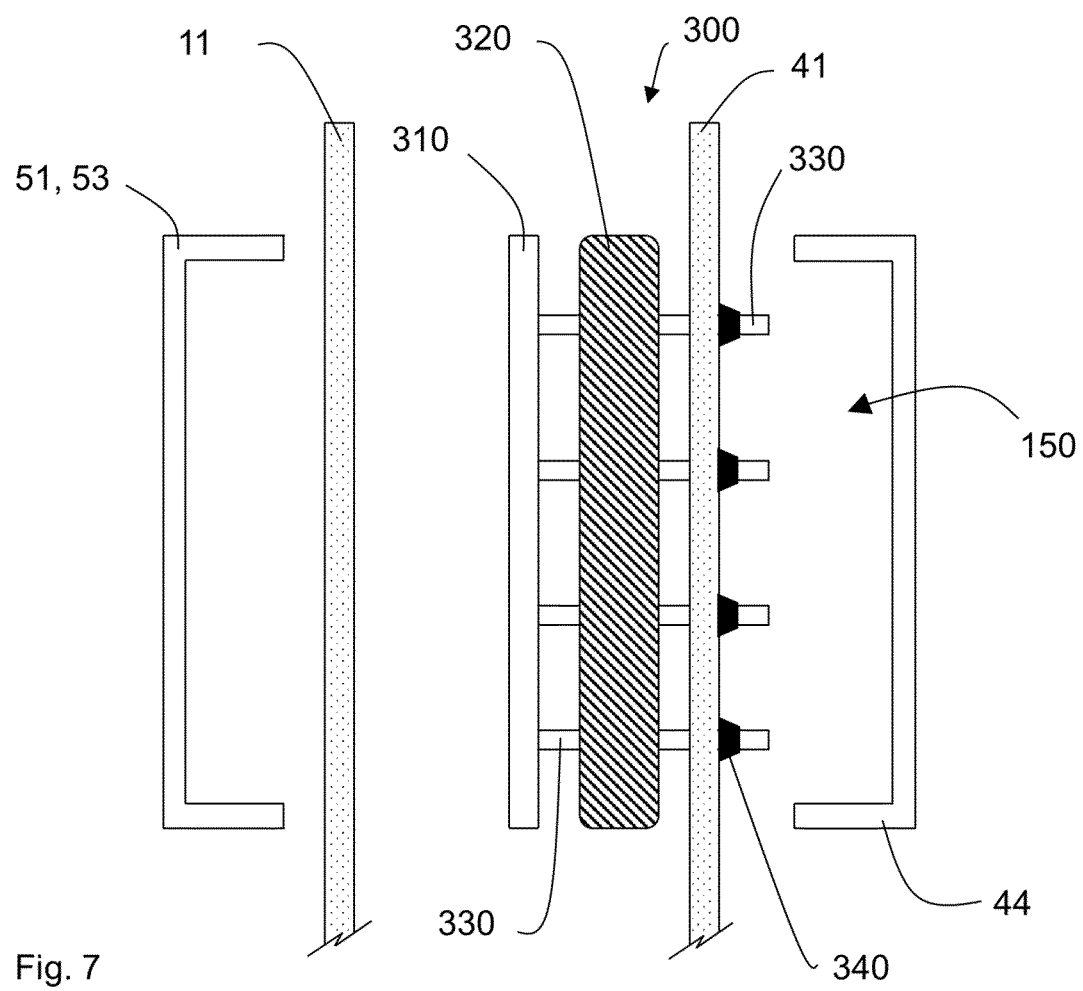

FIG. 7 depicts a lateral exploited view of the uppermost part of inner and outer sidewalls 11, 41 of inner and outer tank parts 40, 10; respectively. The figure also depicts a U-shaped beam 51, 53 which is to be attached e.g. by welding or by any other suitable method, to the inner tank portion; and an adjustable pad 300 coupled to the outer sidewall 41 via a plurality of elongated studs 330.

In examples where the tank comprises an adjustable pad 300, the outer sidewall 41 may comprise a plurality of apertures (not shown) for enabling the elongated studs 330 to pass through. A plurality of fastening points may therefore be created. Such apertures may have a diameter slightly greater than the width of the studs 330 to facilitate their insertion and/or removal. In an example, the diameter may be e.g. _ mm. The number and the arrangement of the apertures may depend on the number and the arrangement of the studs, respectively.

The adjustable pad 300 may comprise a flat plate 310 to be arranged between the inner and outer sidewalls 11, 41; and at a variable distance from the outer sidewall i.e. the gap between the flat plate and the outer sidewall may be varied. The flat plate 310 may be made of any material e.g. mild or stainless steel, which provides enough stiffness to withstand operational loads but at the same time may be lightweight and cost effective. The dimensions of the flat plate 310 may vary e.g. according to the dimensions and/or size of the tank. In an example, the dimensions of the flat plate may be e.g. 70×70×1 cm.

The flat plate 310 may comprise a plurality of elongated studs 330 attached, e.g. welded, thereto. The studs may be made of the same material of the flat plate, e.g. mild or stainless steel, or may be made of a different material e.g. stainless or blued steel. The dimensions of the studs 330 i.e. length and diameter, may depend e.g. on the size of the tank. In an example, the studs 330 may have a length of about e.g. 10 cm, and a diameter between e.g. 1.6-3 cm.

The adjustable pad 300 may further comprise fastening elements 340 to secure the studs, and thus, the adjustable pad itself to the outer sidewall 41. The number of fastening elements 340 may be equal to the number of studs in order to ensure a tight fixation of the adjustable pad 300 to the outer sidewall 41.

The fastening elements 340 may enable to fasten the adjustable pad to the outer sidewall 41 at different degrees of torque. In an example, the different degrees of torque may imply different distance or the gap between the flat plate 310 and the outer sidewall 41. For instance, a higher degree of torque may involve a shorter distance or gap between the flat plate 310 and outer wall 41, i.e. the flat plate and the outer sidewall may be closer to each other, than with a lower degree of torque.

In order to have a balanced and an even flat plate, all the fastening elements 340 may be tightened at the same or substantially the same degree of torque, and thus, the distance between the flat plate 310 and the outer sidewall 41 may be the same or substantially the same at all the fastening points.

In an example, the fastening elements 340 may comprise a threaded inner side and the studs 330 may comprise a matching threaded portion (not shown) in which the fastening elements 340 may be screwed. Therefore, by screwing and unscrewing the fastening elements, different degrees of torque, and consequently the distance between the flat plate and the outer sidewall, may be achieved. In an example, the fastening elements may be nuts.

The adjustable pad 300 may further comprise a compressible strip 320 that may be arranged between the flat plate and the outer panel. The compressible strip 320 may be made of any material, e.g., elastomer, rubber such as Viton, nitrile, etc.; that adapts its volume to the variable gap between the flat plate and the outer sidewall. That is, a material which may be compressed when the fastening elements are tightened, and which may expand and fill the space between the flat plate and the outer sidewall when the degree of torque is lessened.

In some examples, when the fastening elements are tightened, and as consequence of the compression, the compressible strip 320, may be configured to slightly protrude laterally from the flat plate thereby enabling a further compression.

The compressible strip 320 may comprise a plurality of drilled holes (not shown) to allow the studs to pass through. The arrangement, the number and the size of the drilled holes may depend on the arrangement, the number and the size of the studs.

In operation the space between inner and outer sidewalls 11, 41 will be in fluid communication with the internal space of the tank which will be filled with insulating liquid. As the outer sidewall may comprise apertures having a diameter slightly greater than the width of the studs, the insulating liquid may leak.

In order to prevent the insulating liquid spillage, the outer sidewall 41 may comprise a sealing panel 44 that may be attached at its outer side, e.g. by adhesive, by welding or by any other suitable method, and wherein the panel may cover or enclose the plurality of apertures of the outer sidewall. A sealing chamber 150 may thus be created between the outer sidewall and the sealing panel where the insulating liquid leaking from the apertures may be confined.

The sealing panel 44 may comprise a U-shaped cross-section having a top wall and four sidewalls, and may be made of e.g., mild steel.

Once the outer and inner portions of the upper tank portion 1 are mounted together, the fastening degree, i.e. the degree of torque, of the fastening elements may be adjusted, i.e. loosened, to increase the gap between the adjustable pad 300 and the outer sidewall, until the adjustable pad contacts the inner sidewall. Therefore, during normal operation, the adjustable pad may then transmit the usual operating forces, such as short circuit loads, from the inner tank portion to the outer tank portion. As both inner and outer tank portions may absorb part of the operational loads, the structure of the tank may be reinforced and thus, the tank may withstand larger loads, preventing the deflection of the U-shaped beam.

Moreover, in the event of an overpressure, such as caused by an internal arc, and as the adjustable pad 300 is not attached to the inner sidewall, the outer panel may freely deflect in order to absorb at least part of the energy of the pressure wave. The risk of a rupture of the tank may therefore be substantially reduced, which provides a safer tank.

In an example (not shown), each U-shaped beam 51, 53 may comprise an adjustable pad 300 arranged at its central portion thereby further strengthening the overall structure of tank.

Figure 6:
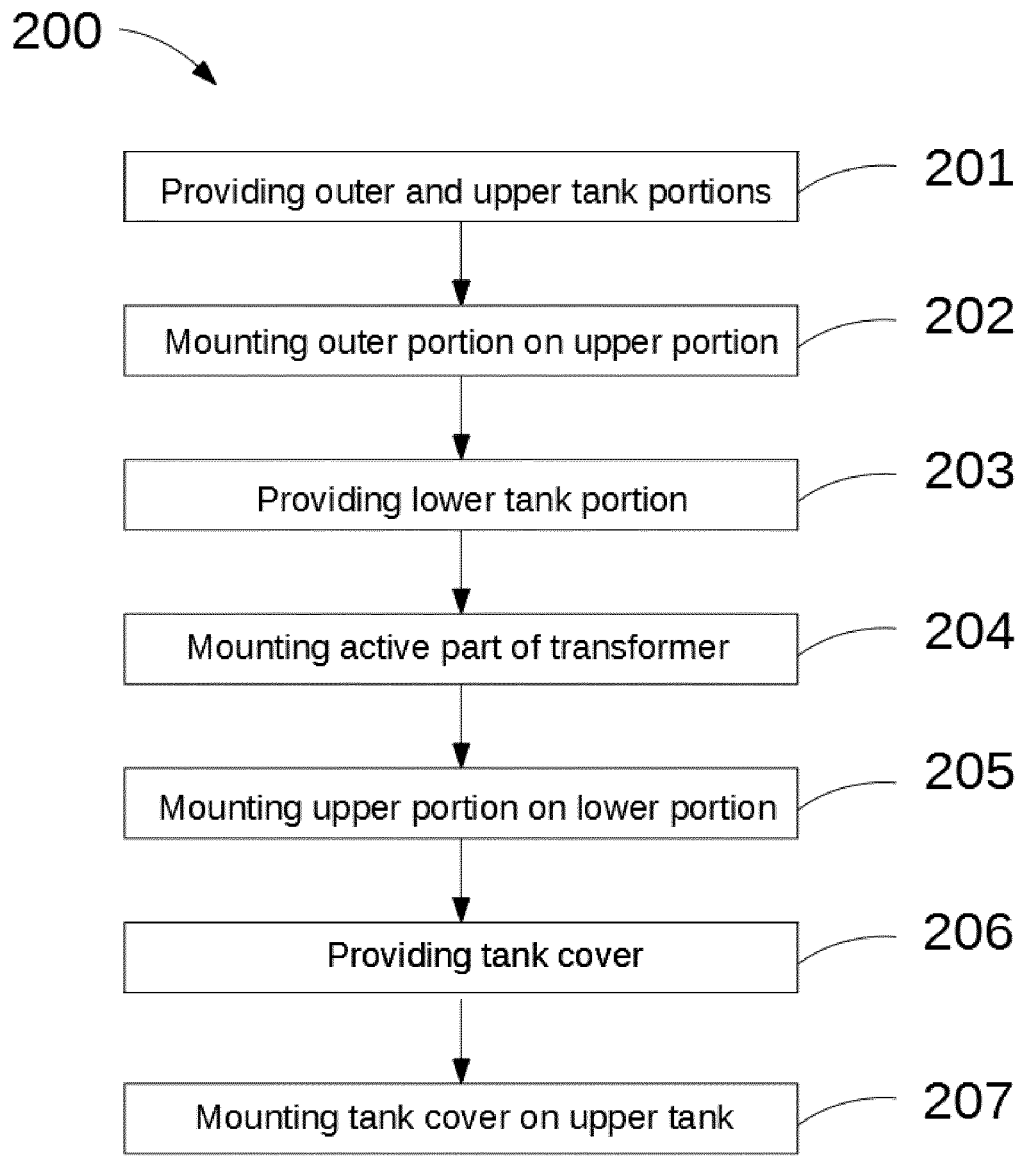
FIG. 6 is a flow diagram illustrating an example of a method for assembling a liquid-filled shell transformer or shell reactor, FIG. 7 schematically illustrates a transformer tank comprising an adjustable pad according to an example.

A transformer or reactor with a tank according to the present disclosure may be assembled by embodiments of a method 200 comprising for example the following operations, as shown in FIG. 6. Operations include providing (block 201) an outer tank portion and an inner tank portion, configured to be joined to each other along a substantially horizontal perimetric joining line, wherein the inner tank portion comprises a short circuit beam mounted at an inner surface of inner sidewalls of the inner tank portion. Operations include mounting (block 202) the outer tank portion on the inner tank portion and welding them together along the perimetric joining line thereby forming an upper tank portion. Operations include providing (block 203) a lower tank portion configured to be joined to the inner tank portion along a substantially horizontal further perimetric joining line. Operations include mounting (block 204) an active part of the shell transformer or shell reactor inside the lower tank portion andn block 205: mounting (block 205) the inner tank portion on the lower tank portion and welding them together along a further perimetric line. Operations further include providing (block 206) a tank cover and mounting (block 207) the tank cover on top of the outer tank portion and welding them together.

The assembly of the outer tank portion and inner tank portion may of course be carried out at any time before the assembly is mounted on the lower tank portion.

If the transformer or reactor tank comprises a reinforcing cincture 100 such as described above, in the above method the outer tank portion may be provided with a upper reinforcing ring, and the lower tank portion may be provided with a lower reinforcing ring, before the inner and outer tank portions are mounted on the lower tank portion. The closure plate or belt of the reinforcing cincture is applied and welded after the inner tank portion and lower tank portion have been mounted and welded to each other. The closure plate or belt may be attached for example as the last step of the process, after mounting the tank cover.

In examples where the tank comprises an adjustable pad 300 the assembling method 200 may comprise providing an outer tank portion having a plurality of apertures.

In addition, and previous to mounting the outer tank portion on the inner tank portion, in block 202; an adjustable pad 300 according to any of the disclosed examples may be provided and afterwards coupled to the outer sidewall 41 e.g. to be in correspondence with the central region 57 of the U-shaped beam once the outer tank portion is mounted on the inner tank portion.

In order to provide the adjustable pad, firstly, a plurality of studs may be attached e.g. welded, to a flat plate according to any of the disclosed examples. A compressible strip may then be coupled to the flat plate: a compressible strip 320 comprising a plurality of drilled holes may be provided, the strip may then be put in the proximity of the flat plate in order to align the drilled holes with the studs and finally, the studs may be introduced into the holes. The strip and the flat may therefore be brought together.

Afterwards, the flat plate comprising the studs and the compressible strip may be arranged adjacent to the outer side wall of the outer tank portion. The studs may then be aligned with the plurality of apertures of the outer sidewall and then introduced into the apertures. A plurality of fastening elements 340 may then be coupled to the studs and, afterwards, the fastening elements may be secured. The adjustable pad 300 may therefore be coupled to the outer sidewall 41.

Next, and prior to mounting the outer tank portion on the inner tank portion, in block 202; the degree torque of the fastening elements 340 may be increased, e.g., by screwing. The distance D2 (see FIG. 8A) between the flat plate and the outer sidewall may be reduced thereby preventing the adjustable pad from colliding with the inner sidewall upon mounting the outer tank portion thereon. By keeping the flat plate close to the sidewall, i.e. reducing the distance between both elements, the assembling process may be facilitated.

After mounting and welding the outer and the inner tank parts together, in block 202, the degree of torque of the fastening elements may be lessened until the flat plate contacts the inner sidewall 11 of the inner tank portion 10. The sealing panel may then be attached, e.g., welded, to the outer sidewall.

The outer and the inner tank portions 10, 40 may therefore be mechanically linked and/or can work together at the central region 57 of the U-shaped beam 51, 53. As a result, at least part of the operational loads withstood by the U-shaped beam may be transferred to the outer sidewall, the overall structure of the tank may therefore be strengthened i.e. larger operational loads may be withstood. By using an adjustable pad mechanically linking outer and inner sidewalls, the U-shaped beam may thus be prevented from deflecting at its weakest point i.e. the central region.

In addition, in the event of an overpressure, e.g., a result of an internal arc, and as the adjustable pad may not be coupled to the inner side wall, the outer sidewall can freely deflect outwardly. The outer sidewall may absorb part of the overpressure loads, and thus, the rupture of the tank may be prevented which reduces the explosion risk.

Figure 8A:
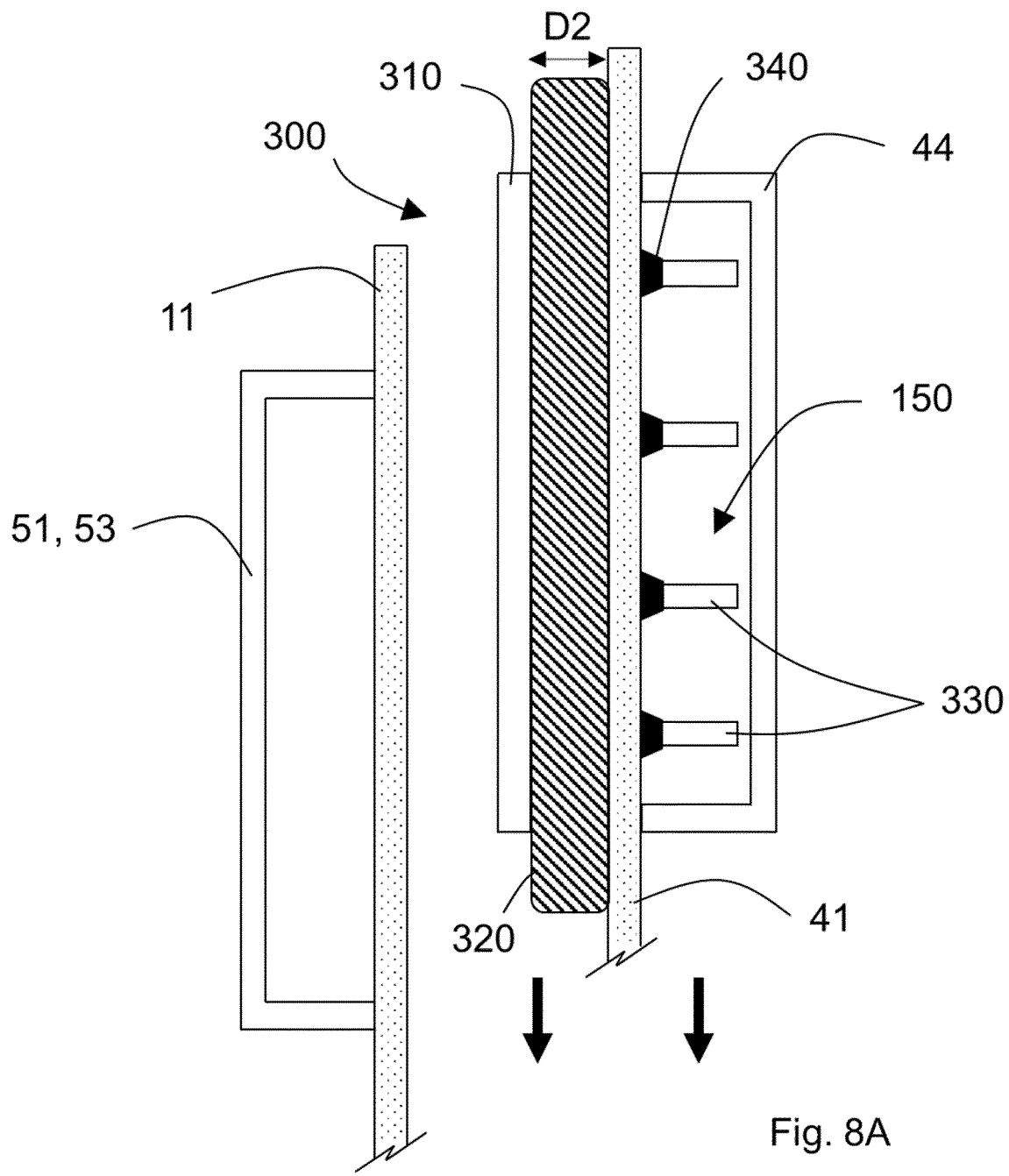
FIGS. 8A and 8B illustrate two different stages of a method for assembling a transformer tank comprising an adjustable pad according to an example.
Figure 8B:
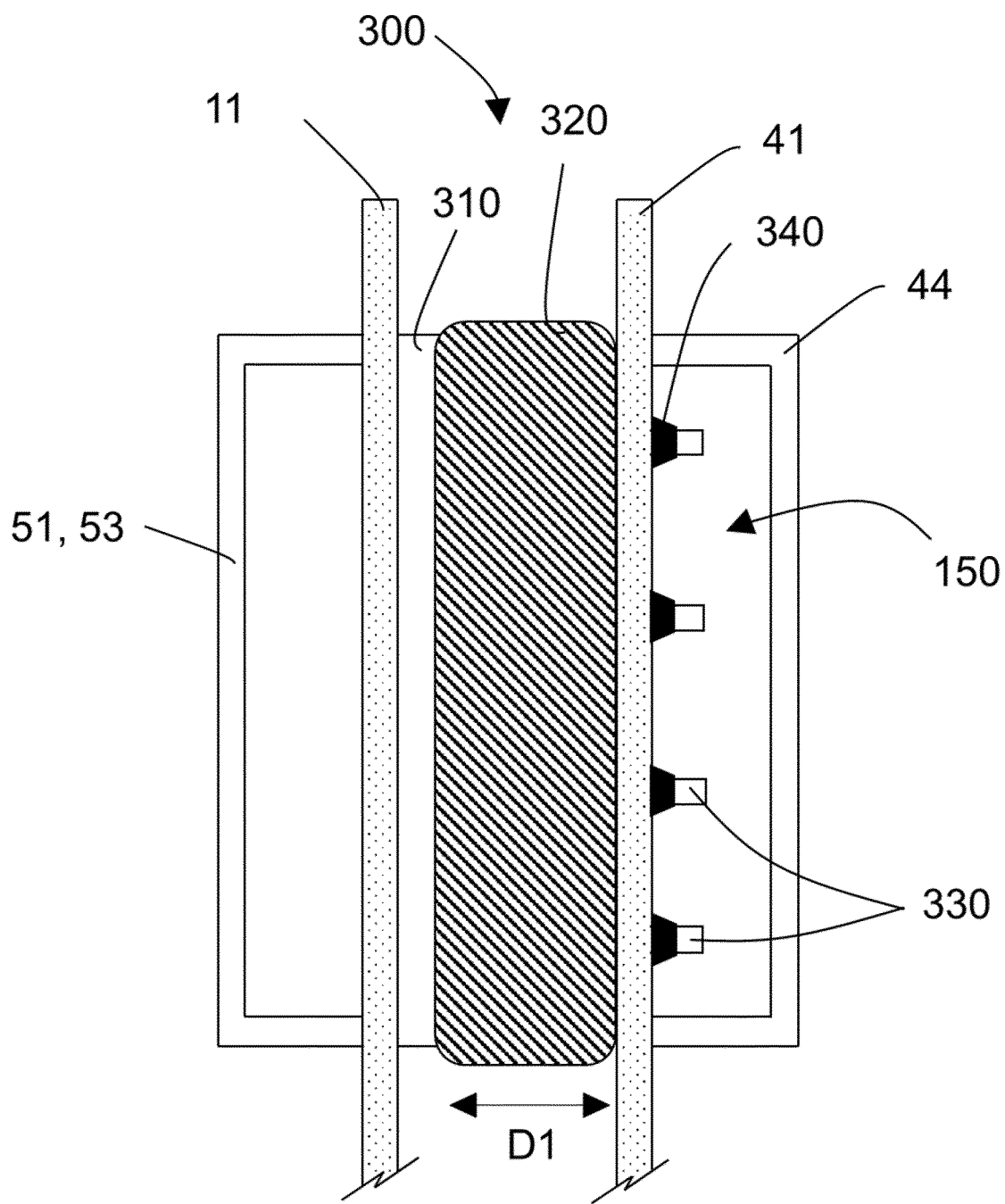

FIGS. 8A and 8B show the inner and outer sidewalls at two different mounting stages. The figures also show the gap or distance D1, D2 between the flat plate 310 and the outer sidewall 41 at each stage.

FIG. 8A depicts the outer tank portion being mounted (see the arrows) on the inner tank portion. In the example, the inner sidewall 11 comprises a U-shaped beam attached thereto, and the outer sidewall 41 comprises an adjustable pad and a sealing panel 44 coupled thereto.

In the figure, the fastening elements may comprise a high degree of torque in order to reduce the distance D2 between the adjustable pad and the outer sidewall. The adjustable pad may therefore be prevented from colliding with the inner wall which facilitates the mounting process. The figure also depicts a compression strip 320 adapting its size to the gap between the flat plate 310 and the outer sidewall 41, e.g., the strip may also laterally protrude as consequence of being compressed.

FIG. 8B shows the outer tank portion already mounted on the inner tank portion. In the figure, the inner side wall 11 and the outer sidewall 41 are shown being mechanically linked by the adjustable pad. With respect to FIG. 8A, the degree of torque of the fastening elements may be gradually lessened (with respect to FIG. 8A) and the distance between flat plate and the outer sidewall increased until the flat plate contacts the inner sidewall. FIG. 8B also shows the compressible strip adapted to the increased distance D1.

Once the adjustable pad contacts the inner sidewall, the outer sidewall and the inner sidewall may work together thereby withstanding larger operational loads which leads to a more robust tank.

In addition, the lack of attachment of the adjustable pad to the inner sidewall, allows the outer sidewall to freely deflect in case of overpressure e.g. due to an internal arc, which prevents the risk of tank explosion. A more secure tank may therefore be achieved.

Although only a number of particular embodiments and examples have been disclosed herein, it will be understood by those skilled in the art that other alternative embodiments and/or uses of the disclosed innovation and obvious modifications and equivalents thereof are possible. Furthermore, the present disclosure covers all possible combinations of the particular embodiments described. The scope of the present disclosure should not be limited by particular embodiments, but should be determined only by a fair reading of the claims that follow.

The invention claimed is:

1. A tank for a liquid-filled shell transformer or shell reactor, comprising:
a lower tank portion comprising a bottom plate and lower sidewalls, and an upper tank portion, wherein the upper tank portion comprises an inner tank portion with inner sidewalls and an outer tank portion with outer sidewalls, wherein the outer sidewalls are arranged radially outwardly with respect to the inner sidewalls such that the outer tank portion surrounds the inner tank portion,
the lower tank portion and the inner tank portion being joined together along a substantially horizontal first perimetric joining line and defining an internal space for housing an active part of the shell transformer or shell reactor and an insulating liquid, wherein a space is formed between the inner sidewalls and the outer sidewalls, wherein the space is in fluid communication with the internal space for housing the active part of the shell transformer or shell reactor and insulating liquid, and
the outer tank portion and the inner tank portion being joined together along a substantially horizontal second perimetric joining line, wherein the tank further comprises a tank cover configured to be joined to an upper end of the outer sidewalls of the outer tank portion.

2. A tank according to claim 1, wherein the outer sidewalls of the outer tank portion are arranged at a distance of at least 15 millimetres from the inner sidewalls of the inner tank portion, preferably at a distance between 20-60 millimetres, more preferably at a distance between 20-30 millimetres.

3. A tank according to claim 1, wherein the tank further comprises a short circuit beam mounted at an inner surface of the inner sidewalls.

4. A tank according to claim 1, wherein the lower sidewalls comprise a first horizontal flange and the inner sidewalls comprise a second horizontal flange, and wherein the lower tank portion is joined to the inner tank portion via the first horizontal flange and the second horizontal flange, by welding.

5. A tank according to claim 4, wherein the outer sidewalls comprise a third horizontal flange, wherein the outer tank portion and the inner tank portion are joined together via the third horizontal flange and the second horizontal flange, by welding.

6. A tank according to claim 1, wherein the tank further comprises a reinforcing cincture surrounding and joined to the lower sidewalls of the lower tank portion and the outer sidewalls of the outer tank portion and forming a sealed chamber enclosing the first perimetric joining line between the lower tank portion and the inner tank portion and the second perimetric joining line between outer tank portion and the inner tank portion.

7. A tank according to claim 6, wherein the reinforcing cincture is joined to a horizontal flange of the lower sidewalls of the lower tank portion and joined to a portion of the outer sidewalls of the outer tank portion, by welding.

8. A tank according to claim 6, wherein the reinforcing cincture comprises a lower reinforcing ring surrounding and joined to a horizontal flange or to a portion of the lower sidewalls of the lower tank portion, and an upper reinforcing ring surrounding and joined to a portion of the outer sidewalls of the outer tank portion.

9. A tank according to claim 8, wherein the reinforcing cincture comprises a belt or closing plate joined to the lower reinforcing ring and to the upper reinforcing ring.

10. A tank according to claim 1, wherein the flexibility of at least part of the tank cover is the same as the flexibility of the outer sidewalls of the outer tank portion.

11. A tank according to claim 1, wherein the tank further comprises one or more reinforcing ribs on an outer surface of at least two of the outer sidewalls.

12. The tank according to claim 1, wherein the outer sidewall further comprises:
a plurality of apertures;
an adjustable pad coupled at the inner side, the pad comprising:
a flat plate to be arranged between the inner sidewall and outer sidewall of the inner and outer tank portions, respectively;
a plurality of studs attached to the flat plate, wherein each stud is arranged to be in correspondence with an aperture of the plurality of apertures of the outer sidewall;
a plurality of fastening elements for coupling the flat plate to the outer sidewall, wherein the fastening elements enable adjusting the distance between the flat plate to the outer sidewall; and
whereby the pad enables a free deflection of the outer panel under overpressure loads and enables a mechanical cooperation between the inner and outer sidewalls.

13. The tank according to claim 12, wherein the pad is coupled to the outer sidewall at an area to be substantially in correspondence with the central area of the short circuit beam.

14. The tank according to claim 12, further comprising a sealing panel attached at the outer side thereby creating a sealing chamber enclosing the plurality of apertures for avoiding cooling fluid spillage during operation.

15. The tank according to claim 12, wherein the pad further comprises a compressible strip to be arranged between the flat plate and the outer sidewall.

16. The tank according to claim 15, wherein the compressible strip comprises drilled holes, wherein each hole is to be arranged in correspondence a stud.

17. The tank according to claim 15, wherein the compressible strip is made of an elastomer or rubber.

18. The tank according to claim 12, wherein the flat plate is made of mild or stainless steel.

19. The tank according to claim 12, wherein the fastening elements are nuts.

20. A liquid-filled shell transformer or shell reactor comprising a tank according to claim 1.

21. A method for assembling a liquid-filled shell transformer or shell reactor according to claim 20, comprising:
- providing an outer tank portion and an inner tank portion, configured to be joined to each other along a substantially horizontal perimetric joining line, wherein the inner tank portion comprises a short circuit beam mounted at an inner surface of inner sidewalls of the inner tank portion,
- mounting the outer tank portion on the inner tank portion and welding them together along the perimetric joining line thereby forming an upper tank portion,
- providing a lower tank portion configured to be joined to the inner tank portion along a substantially horizontal further perimetric joining line,
- mounting an active part of the shell transformer or shell reactor inside the lower tank portion,
- mounting the inner tank portion on the lower tank portion and welding them together along the further perimetric line,
- providing a tank cover;
- mounting the tank cover on top of the outer tank portion and welding them together.

22. The method according to claim 21, wherein, previous to mounting the outer tank portion on the inner tank portion and welding them together along the perimetric joining line, the method further comprises:
- providing a plurality of apertures on the outer sidewall of the outer tank portion;
- coupling to the outer sidewall an adjustable pad, the pad comprising a flat plate comprising a plurality of studs attached thereto and a plurality of fastening elements for adjusting the distance between the tightening plate, and
- tightening the fastening elements thereby reducing the distance between the flat plate and the outer sidewall.

23. The method according to claim 22, wherein, after mounting the outer tank portion on the inner tank portion and welding them together along the perimetric joining line thereby forming an upper tank portion, the method further comprises:
- releasing the fastening elements thereby increasing the distance between the flat plate and the outer sidewall until the flat plate contacts the inner sidewall of the inner tank portion.

24. The method according to claim 23, wherein, after releasing the fastening elements thereby increasing the distance between the flat plate and the outer sidewall until the flat plate contacts the inner sidewall of the inner tank portion, the method further comprises:
- attaching a sealing panel to the outer side of the outer sidewall in correspondence with the plurality of apertures thereby forming a sealed compartment for enclosing the plurality of apertures.

\* \* \* \* \*